United States Patent
Meissner et al.

(10) Patent No.: US 9,067,786 B2
(45) Date of Patent: Jun. 30, 2015

(54) PRIMARY REFORMER WITH SECONDARY INLET CHANNELS SUPPLYING THE BURNER

(75) Inventors: Oliver Meissner, Gladbeck (DE); Silke Wodberg, Gevelsberg (DE)

(73) Assignee: Uhde GmbH, Dortmund (DE)

( * ) Notice: Subject to any disclaimer, the term of this patent is extended or adjusted under 35 U.S.C. 154(b) by 850 days.

(21) Appl. No.: 12/451,012

(22) PCT Filed: Mar. 22, 2008

(86) PCT No.: PCT/EP2008/002307
§ 371 (c)(1),
(2), (4) Date: Apr. 1, 2010

(87) PCT Pub. No.: WO2008/131832
PCT Pub. Date: Nov. 6, 2008

(65) Prior Publication Data
US 2010/0193741 A1    Aug. 5, 2010

(30) Foreign Application Priority Data

Apr. 25, 2007    (DE) .......................... 10 2007 019 830

(51) Int. Cl.
*B01J 7/00* (2006.01)
*C01B 3/38* (2006.01)
*B01J 8/06* (2006.01)
(Continued)

(52) U.S. Cl.
CPC .................. *C01B 3/384* (2013.01); *B01J 8/062* (2013.01); *B01J 2208/00495* (2013.01); *B01J 2208/00504* (2013.01); *B01J 2208/00548* (2013.01); *C01B 2203/0233* (2013.01); *C01B 2203/0816* (2013.01); *C01B 2203/0822* (2013.01); *C01B 2203/1235* (2013.01);
(Continued)

(58) Field of Classification Search
None
See application file for complete search history.

(56) References Cited

U.S. PATENT DOCUMENTS 2,028,326 A    1/1936    Hanks et al.
2,194,500 A    3/1940    Herthel et al.
(Continued)

FOREIGN PATENT DOCUMENTS

DE    1 767 980 A1    3/1972
DE    69 420 604 T2    5/2000
(Continued)

*Primary Examiner* — Imran Akram
(74) *Attorney, Agent, or Firm* — Marshall & Melhorn, LLC

(57) ABSTRACT

The invention relates to a reactor for catalytic reformation of hydrocarbons with steam at elevated pressure, said reactor comprising a reaction space and a fire space, said reaction space comprised of a multitude of vertical tubes arranged in rows and suitable for being filled with a catalyst, and having facilities for feeding hydrocarbons and steam to be reformed to the reaction space, and furthermore comprising facilities for discharge of reformed synthesis gas from the reaction space, and furthermore comprising a multitude of firing facilities in the upper area of the firing space, said firing facilities being able to generate mainly downwardly directed flames that are suitable to heat the aforementioned reaction tubes, with the tube feeding air to the burner being equipped with a facility for adjusting and setting the air flow, and there being a secondary air feeder mounted additionally to this tube and branching-off from it and configured in various layouts and having an independently controllable facility for adjusting and setting the air flow and also feeding air to the firing device so that a more favorable ratio of fuel gas versus air results at the burners so as to be able to achieve a waste gas poor in nitric oxides.

7 Claims, 2 Drawing Sheets

(51) Int. Cl.
*F23C 5/00* (2006.01)
*F23C 7/00* (2006.01)
*F23D 23/00* (2006.01)

(52) U.S. Cl.
CPC .......... *C01B 2203/1695* (2013.01); *F23C 5/00* (2013.01); *F23C 7/00* (2013.01); *F23D 23/00* (2013.01)

(56) References Cited

U.S. PATENT DOCUMENTS

| | | | |
|---|---|---|---|
| 2,894,826 A | | 7/1959 | Stengel |
| 4,568,583 A | * | 2/1986 | Twigg ........................ 122/44.2 |
| 5,639,431 A | | 6/1997 | Shirasaki et al. |
| 6,190,158 B1 | | 2/2001 | Legiret et al. |
| 6,773,256 B2 | | 8/2004 | Joshi et al. |
| 6,793,700 B2 | | 9/2004 | Pham et al. |
| 7,837,974 B2 | | 11/2010 | Hederer et al. |
| 2002/0110505 A1 | * | 8/2002 | Wang et al. .................... 422/198 |
| 2003/0131533 A1 | * | 7/2003 | Pham et al. .................. 48/197 R |
| 2004/0180247 A1 | * | 9/2004 | Higashiyama et al. ......... 429/19 |

FOREIGN PATENT DOCUMENTS

| | | |
|---|---|---|
| EP | 1 329 256 A1 | 7/2003 |
| GB | 1 192 688 A | 5/1970 |
| WO | WO 2005/018793 A1 | 3/2005 |
| WO | WO 2006/119812 A1 | 11/2006 |

* cited by examiner

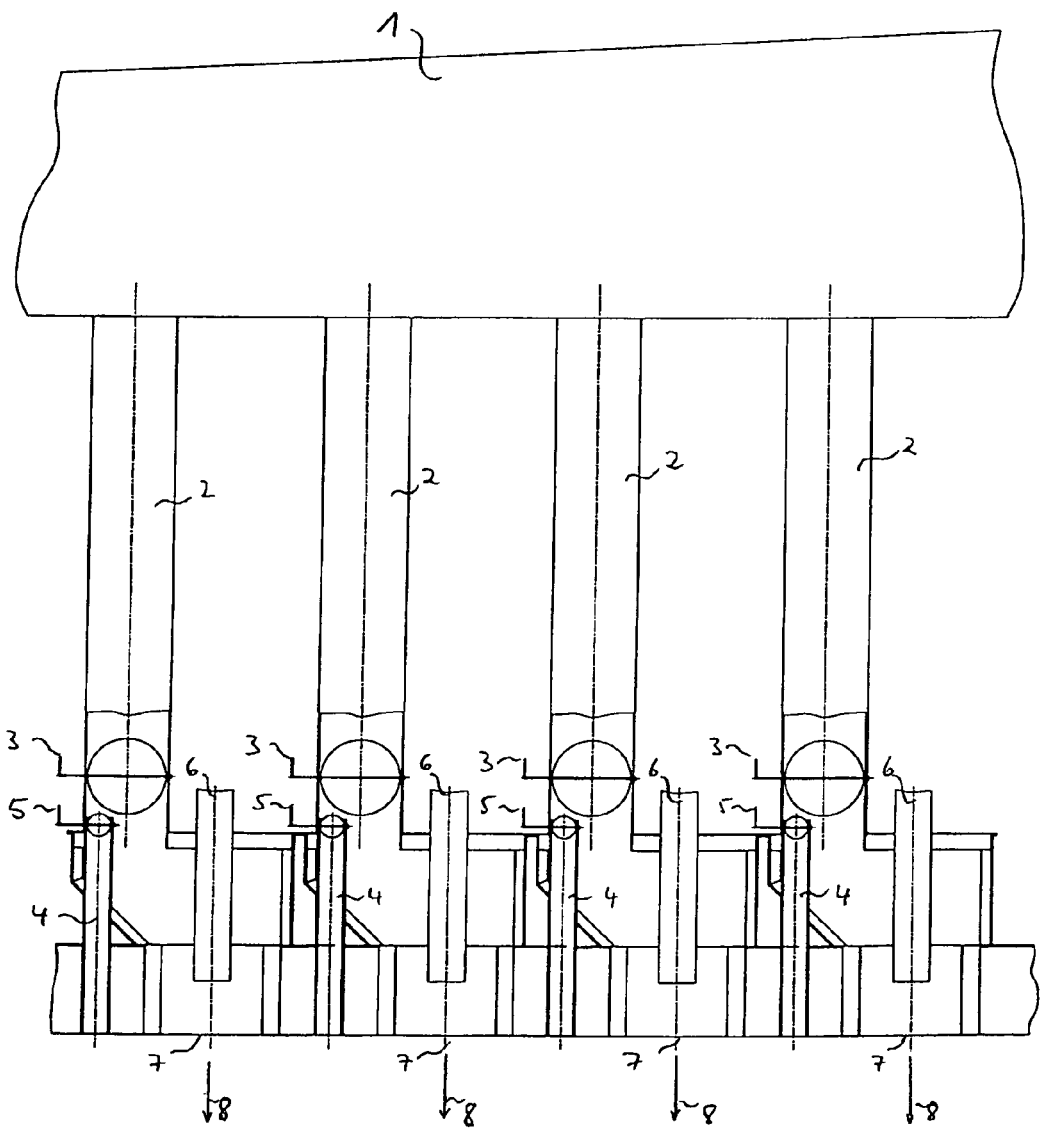

PRIMARY REFORMER WITH SECONDARY INLET CHANNELS SUPPLYING THE BURNER

BACKGROUND OF THE INVENTION

The invention relates to a reactor for catalytic reformation of hydrocarbons with steam under elevated pressure to produce synthesis gas. Synthesis gas of this kind, for example, serves to produce ammonia, hydrogen, and methanol.

Reactors for catalytic reformation of hydrocarbons with steam have been known for a long time and are known in a multitude of layouts. For large-capacity plants, a design has paved its way in which a top-fired box-type furnace with upright standing reaction tubes and/or split tubes is implemented. The split tubes are arranged in series. The tubes are passed through from top to bottom by process gas which forms the input gas. The input gas is subjected to a so-called splitting process.

The gas outlet temperatures usually range at 850° C. and beyond. In the lower area—inside or outside the furnace—the process gas is collected in so-called outlet collectors. Burners firing vertically downwards are arranged in the "lanes" lying between the tube rows. This area is designated as furnace box. Generated flue gas streams from top to bottom through the furnace and is discharged through so-called flue gas tunnels lying at the bottom. On average, the temperatures in the furnace box range between 1000 and 1250° C. For thermal insulation and for protection from high temperatures prevailing due to heating, the furnace walls are lined with a protective refractory lining.

The reaction space heated by the furnace usually comprises a multitude of gas-proof sealed vertical tubes arranged in rows and being suitable for being filled with a catalyst. These serve for process management and they are equipped with facilities for supplying hydrocarbons to be reformed and steam heated-up to 650° C. to the reaction space as well as facilities for discharging the reformed synthesis gas from the reaction space.

In its lower area, the furnace space in which the firing devices are arranged has a chamber for collection of flue gases as well as a multitude of mainly horizontally arranged bricked tunnels extending in parallel to each other and perpendicular to the vertical tubes for discharge of flue gases. At their sides, these bricked tunnels have apertures to allow a discharge of flue gases from the furnace space. The tunnels are usually bricked-up of masonry materials.

WO2005/018793 A1 describes a typical furnace system and a method for catalytic reformation of hydrocarbons with steam at elevated pressure to obtain synthesis gas. A special configuration of the external walls of the tunnels is applied in order to achieve a better homogenization of the flue gas flow and to obtain a more uniform temperature distribution of the furnace firing. WO2005/018793 A1 describes a typical furnace system and a method for catalytic reformation of hydrocarbons with steam to obtain synthesis gas by supplying oxygen to adapt the stoichiometry and with a special pore burner installed further downstream to avoid formation of soot.

All the reforming systems described hereinabove have in common that a firing device comprised of a multitude of burners arranged between process managing reaction tubes heats the oven space with the reforming tubes leading through the furnace space. Burners serving for firing the oven space are usually supplied with fuel gas and air through separate channels. The supply of fuel gas into the burner space is accomplished separately from the supply of air. The penetration of gas feeders into the burner space is accomplished through the refractory furnace lining or immediately in front of it. With hitherto applied designs, the ratio between fuel gas and air for the burners is controlled by a butterfly flap or a similarly designed facility for the adjustment of the gas flow of the air supply. The burner firing and thus the furnace temperature can be controlled via this facility. Though this design is efficient, it bears a disadvantage in that the local air supply at the burners can be poorly controlled and leads to unfavorable ratios between fuel gas and air in some isolated cases.

The ratio between oxygen and fuel gas can technically be described by the so-called Lambda ($\lambda$) value. On applying a stoichiometrical mol ratio of oxygen versus fuel gas, one obtains a Lambda value of 1.0. On using an oxygen portion which is lower in the stoichiometrical combustion ratio, one obtains a Lambda value which is lower than 1.0. Applying an oxygen portion which is higher in the stoichiometrical combustion ratio, one obtains a Lambda value which is higher than 1.0. Therefore, combustion is optimal if the Lambda value amounts to 1.0. With conventional designs, one obtains Lambda values at the individual burners which fluctuate due to operation and which may have temporarily higher values.

This takes an adverse effect on the combustion process. Its consequence may be a higher total consumption of fuel gas relative to the turnover of the reforming process. With a change of the fuel material, the supply of air can hardly be adjusted to the modified stoichiometry. Consequently, it may temporarily entail an unintentional increase in the flame temperature and, as a result of an increased inflow of air, it may involve an intensified formation of nitric oxides of the $NO_x$ type. As pollutants in the atmosphere, nitric oxides contribute to acid rain.

BRIEF SUMMARY OF THE INVENTION

Now, therefore, it is the object of the present invention to find a possibility for improving the supply of air into the burner system with the aim to allow for an optimal adjustment of the supply of air into the burner throughout the whole period of the process. This will improve the combustion of fuel gas and thus the fuel gas yield from the reforming process. Optimal Lambda values should constantly be adjusted and set at the individual burners so that the flame temperature will always just have the required level. Thereby, the formation of harmful nitric oxides can be reduced substantially or be stopped entirely.

BRIEF DESCRIPTION OF THE DRAWINGS

FIG. 2 shows the feeder system in a miniaturized form and the schematic diagram of the air and fuel gas supply at the burner.

DETAILED DESCRIPTION OF THE INVENTION

Figure 1:
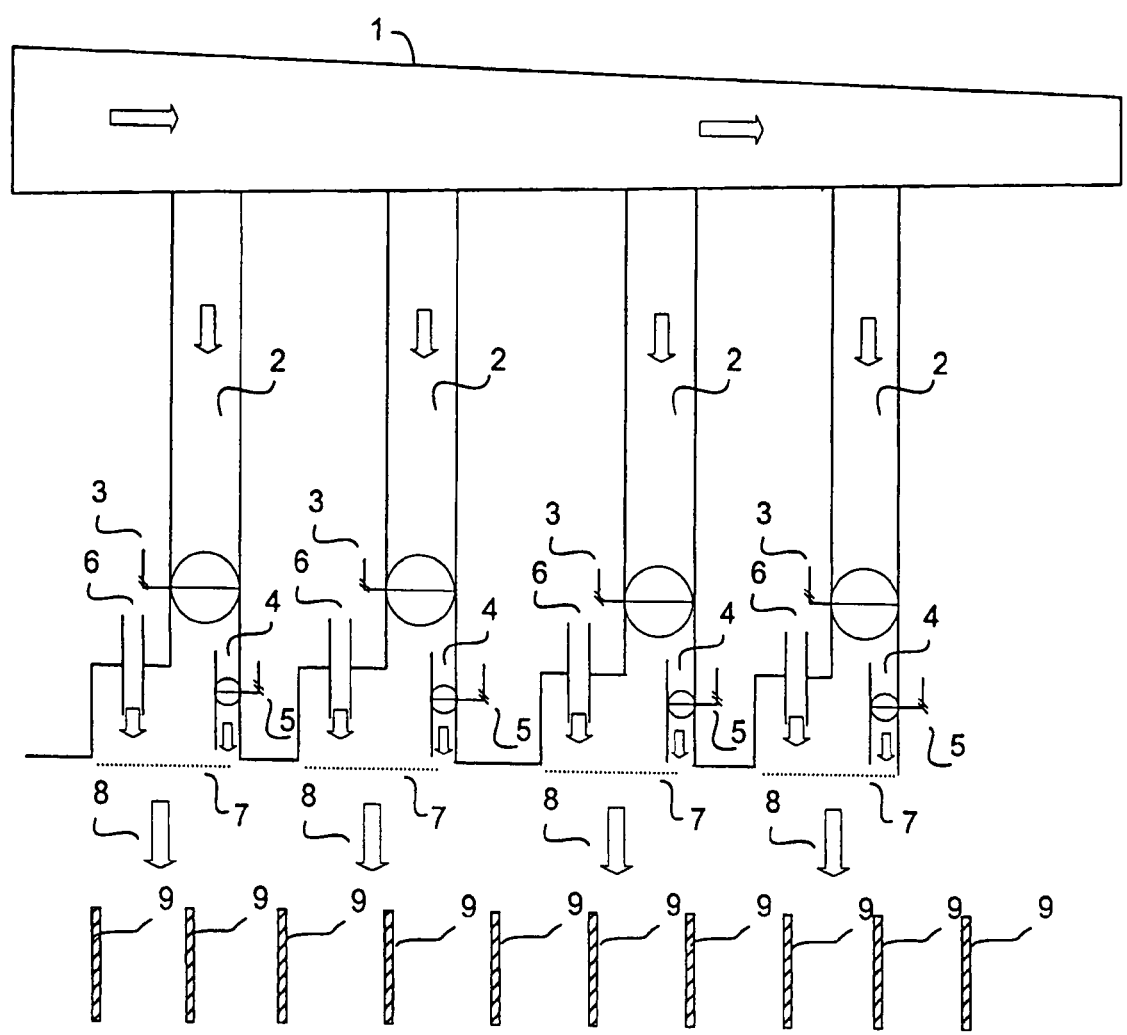
FIG. 1 shows a schematic diagram of the air and fuel gas supply to the burner.

The invention accomplishes this task by a reactor for catalytic primary reformation of hydrocarbons with steam at elevated pressure with a device for top-firing of a reforming process furnace, wherein the firing device heats a thermally insulated furnace space with gas-proof sealed process-managing reforming tubes arranged in the furnace space which are to be fed with a catalyst suitable for reforming processes and through which a reforming gas mixture is passed, and the firing device is comprised of a multitude of burners arranged between these reforming tubes, and the firing device is supplied with fuel gas and air, and separate feeder devices exist in each burner for both gases, said feeder devices being arranged in flush alignment and being lockable individually or jointly in pairs, and the blending of both gases is accomplished each in the burner or immediately upstream to it, and wherein the feeder device for air into each burner comprises a main inlet channel and an additional secondary inlet channel, and both inlet channels are equipped with facilities that are suitable to adjust the gas flow, and each secondary inlet channel is branched off from the relevant main inlet channel downstream of the facility for adjustment of the gas flow, and wherein the other further extending channel forms a primary air channel, and the ratio of cross-sectional areas of the secondary inlet channel to the main inlet channel upstream to the branch-off of the secondary inlet channel ranges between 1:2 and 1:100.

Each burner is individually supplied with a fuel gas-air mixture and there are separate feeder devices for both gases; and the main air feeder channel allows for an additional air supply at the burner structure through the refractory oven lining ("secondary inlet channel"). The blending of fuel gas and burner is accomplished in the burner.

In one embodiment of the invention, secondary inlet channels and main inlet channels are equipped with feeder devices that can be shut-off and locked individually or jointly in pairs.

In another embodiment of the invention, the secondary butterfly flaps can be operated each immediately next to the associated main butterfly flaps. This enables the operating crew to adjust and set both feeders in one working step.

All feeder channels are preferably directed downwards into the fire space and they are arranged in flush alignment. Depending on the furnace design type, the feeder device of the air inlet channels are inclined or guided via offset steps in order to ensure the technical feasibility of the furnace firing. The devices for the feed of air into the burner space can be configured in the form of slots through the refractory furnace lining. This design allows for a more precise feed of air into the flame space. Optionally and depending on the constructive configuration of the furnace space, this slotted form can also be configured through twisting elements or bifurcated tubes with distributors in order to optimize combustion.

As an alternative in further embodiments of the present invention, the secondary inlet channels are vertically guided from the branch-off point downwards into the fire space, or the secondary inlet channels are inclined or have an offset step, or the secondary inlet channels in the burner entrance area are configured in form of a slot or a twisting element or a bifurcated tube.

The invention also covers a method for catalytic primary reformation of hydrocarbons with steam at elevated pressure with a device for top-firing of a reforming process furnace utilizing the inventive device. Accordingly, it is provided for that the firing device heats a thermally insulated furnace space with gas-proof sealed process-managing reforming tubes arranged in the furnace space which are to be fed with a catalyst suitable for reforming processes and through which a reforming gas mixture is passed, and the firing device is comprised of a multitude of burners arranged between the reforming tubes, and the firing device is supplied with fuel gas and air, and separate feeder devices exist in each burner for both gases, said feeder devices being arranged in flush alignment and being lockable individually or jointly in pairs, and the blending of both gases is accomplished each in the burner or immediately upstream to it, and the feeder device for air into each burner comprises a main inlet channel and an additional secondary inlet channel, and both inlet channels are equipped with facilities that are suitable to adjust the gas flow, and each secondary inlet channel is branched off from the relevant main inlet channel downstream of the facility for adjustment of the gas flow, and wherein the other further extending channel forms a primary air channel, and the ratio of cross-sectional areas of the secondary inlet channel to the main inlet channel upstream to the branch-off of the secondary inlet channel ranges between 1:2 and 1:100, and a constant stoichiometry (Lambda($\lambda$)-value) of 1.05 to 1.15 is adjusted and set as mixing ratio of air versus fuel gas at the outlet of the primary inlet channel. The outlet of the air-fuel gas mixture from the primary inlet channel is also designated as burner brick.

For the inventive implementation of the primary reforming process, a mixture of natural gas and air is preferably utilized for heating. In another embodiment of the process, the burner is heated with an LPG-air mixture instead of a natural gas-air mixture. Usually designated as LPG hydrocarbons is a mixture of $C_3$ and $C_4$ hydrocarbons recovered from the corresponding oil faction and easy to liquefy. Instead of natural gas or LPG, other hydrocarbons which preferably have a boiling point below the ambient temperature are also suitable for use as fuel gas.

The air supply into the burner is optimized by the described manner of supplying secondary air into the flame. Depending on the control mode, an optimal ratio between air and fuel gas as well as an optimal control of the flame are thereby achieved. By taking this measure, the maximum flame temperature in the furnace can be kept at a relatively low level.

Conventional designs for reforming synthesis usually adjust and set a Lambda value of approx. 1.1 at the burners. But this value may fluctuate due to operational conditions. With an inventive implementation of the design, the secondary inlet channel can be opened particularly when supplying a higher volume of air so that the additional air is guided past the primary outlet channel. Thereby, the local Lambda value at the burner brick can be kept at a constant level of 1.05 to 1.15, even though a Lambda value of 1.1 to 1.5 is obtained in the flame.

In one embodiment of the inventive method, the adjustment and setting of the blending ratio of fuel gas versus air at the outlet of the primary inlet channel is accomplished by adjusting and setting the butterfly flaps mounted in the feeder channels and arranged in the entrance area.

In another embodiment of the inventive method, the reforming gas contains methane and heated-up steam. In the inventive device, the reforming gas can be heated-up with the burner effluent gas through heat-exchanging devices in the waste gas discharge tunnel outside the furnace space to a temperature of 500 to 650° C.

In another embodiment of the inventive method, the air needed for heating the burner is heated up with the burner effluent gas through heat-exchanging devices to a temperature of 250 to 450° C. Accordingly, the waste gases in the waste gas discharge tunnel downstream of the heat-exchanging devices are utilized for heating-up the reforming gas, so that the temperature at the tunnel and/or chimney exit generally amounts to 150 to 200° C.

Discharge of combustion gases is accomplished through the aforementioned flue gas tunnels from the brickwork. At their sides, these tunnels have apertures to allow a discharge of flue gases from the furnace space. An efficient discharge of flue gases over the entire furnace space is achieved by way of this measure. The tunnels are usually bricked-up of masonry materials.

The embodiments described hereinabove have the advantage of an optimized adjustment and setting of the air vs. fuel gas ratio at the burners and the benefit of an optimal control of combustion with regard to the adjustment and setting of an optimal Lambda value. It is also known that the nitric oxide content $NO_x$ of a waste gas decreases substantially when applying a more favorable Lambda value at the burner brick. And it is well known that the nitric oxide content $NO_x$ of a waste gas decreases substantially when adjusting and setting a lower flame temperature. This may be gathered from the relevant and well known literature. To give an example, reference is made here to the teaching "The John Zink Combustion Handbook", C. E. Baukel Jr., CRC-Press, London New York, 2001. Nitric oxides of the $NO_x$ type contribute to acid rain.

The inventive configuration of the burner and of the feeder system for fuel gas and air is explained in greater detail by way of two sketches showing a clip of the reforming furnace in a lateral view, with the inventive method not being restricted to these embodiments.

FIG. 1 shows a schematic diagram of the air and fuel gas supply to the burner, commencing at the main air feeder channel 1. The individual feeder channels for air 2 branch-off from here to the individual burners, many of which are shown here to serve as examples. The individual main air feeder channels can also be controlled by individually lockable controlling facilities 3 that are independent of each other. Upstream to the burner feed, the inventive secondary inlet channel 4 for air branches-off from these, said secondary inlet channel also having an individually lockable and independent controlling facility 5. The main air feeder channel is then carried on as primary inlet channel of the air supply. Immediately upstream to the burner, fuel gas 6 is fed into them. The feeder system penetrates at the refractory furnace lining 7 in order to ensure flame management 8 in the furnace space. The reaction tubes 9 provided for the reforming reaction are then heated by this firing.

FIG. 2 again shows the feeder system in a miniaturized form. Also shown here is the schematic diagram of the air and fuel gas supply at the burner, commencing at the main air feeder channel 1. From here, the individual feeder channels for air 2 branch-off to the individual burners (for the sake of synopsis, it is shown here in fourfold to serve as an example). The individual main air feeder channels can be controlled by individually lockable controlling facilities 3 that are independent of each other. Upstream to the burner feed, the inventive secondary inlet channel 4 for air branches-off which also comprises an individually lockable and independent controlling facility 5. The main air feeder channel is than carried-on as primary air channel of the air supply. The fuel gas 6 is fed through controlling facilities into this channel immediately upstream to the burner. The feeder system penetrates at the refractory furnace lining 7 in order to ensure flame management 8 in the furnace space.

List Of Reference Symbols
1 Main air feeder channel to the burner system
2 Main air feeder channel to the individual burners
3 Air feed controlling device of the main inlet channel
4 Secondary inlet channel
5 Air feed controlling device of the secondary inlet channel
6 Fuel gas feed
7 Passage through refractory oven lining ("burner brick")
8 Flame management
9 Reforming gas tubes

The invention claimed is:

1. A reactor for catalytic primary reformation of hydrocarbons with steam at elevated pressure comprising:
   a device for top-firing of a reforming process furnace, wherein
   a firing device configured to heat a thermally insulated furnace space with gas-proof sealed process-managing reforming tubes arranged in the furnace space which are to be fed with a catalyst suitable for reforming processes and through which a reforming gas mixture is passed, and
   the firing device is comprised of a multitude of burners arranged between these reforming tubes, and
   the firing device is connected to a supply of fuel gas and a supply of air, and
   separate feeder devices exist in each burner for the fuel gas and air, said feeder devices being arranged in flush alignment and being lockable individually, and
   each burner is configured to blend the fuel gas and air in the burner, wherein the feeder device for air into each burner comprises a main inlet channel and an additional secondary inlet channel, and
   both inlet channels are equipped with facilities that are suitable to adjust and also to shut-off the gas flow, and
   the secondary inlet channel is branched off from the relevant main inlet channel downstream of the facility for adjustment of the gas flow, and wherein the other channel extends further and forms a primary air channel, and
   the ratio of cross-sectional areas of the secondary inlet channel to the main inlet channel upstream to the branch-off of the secondary inlet channel ranges between 1:2 and 1:100.

2. A device according to claim 1, wherein the secondary inlet channels and the main inlet channels are equipped with individually lockable feeder devices.

3. A device according to claim 2, comprising primary and secondary butterfly flaps, wherein the secondary butterfly flaps can be operated each immediately next to the associated main butterfly flaps.

4. A device according to claim 1, wherein the secondary inlet channels are guided from the branch-off point downwards into the fire space.

5. A device according to claim 1, wherein the secondary inlet channels are inclined or have an offset step.

6. A device according to claim 1, wherein the secondary inlet channels in the burner entrance area are configured in the form of a slot or a twisting element or a bifurcated tube.

7. A reactor for catalytic primary reformation of hydrocarbons with steam at elevated pressure with a device for top-firing of a reforming process furnace, wherein:
   a firing device is configured to heat a thermally insulated furnace space with gas-proof sealed process-managing reforming tubes arranged in the furnace space which are to be fed with a catalyst suitable for reforming processes and through which a reforming gas mixture is passed, and the firing device is comprised of a multitude of burners arranged between these reforming tubes, and the firing device is configured to be supplied with fuel gas and a supply of air, and separate feeder devices exist in each burner for fuel gas and air, said feeder devices being arranged in flush alignment and being lockable individually, and each burner is configured to blend the fuel gas and air, wherein the feeder device for air into each burner comprises a main inlet channel and an additional secondary inlet channel, and both inlet channels are equipped with facilities that are suitable to adjust and also to shut-off the gas flow, and the secondary inlet channel is branched off from the relevant main inlet channel downstream of the facility for adjustment of the gas flow, and wherein the other channel extends further and forms a primary air channel, and the ratio of cross-sectional areas of the secondary inlet channel to the main inlet channel upstream to the branch-off of the secondary inlet channel ranges between 1:2 and 1:100;

the secondary inlet channels are guided from the branch-off point downwards into the fire space;

the secondary inlet channels and the main inlet channels are equipped with individually lockable feeder devices; and the reactor further comprises primary and secondary butterfly flaps, wherein the secondary butterfly flaps can be operated each immediately next to the associated primary butterfly flaps.

* * * * *